Aug. 26, 1924.
G. W. CHARETTE
HOSE COUPLING
Filed Jan. 15, 1923
1,506,048
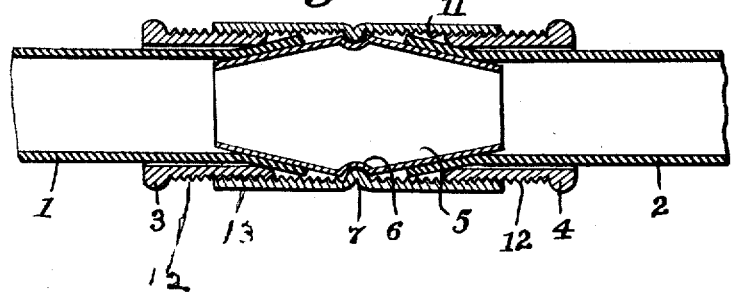
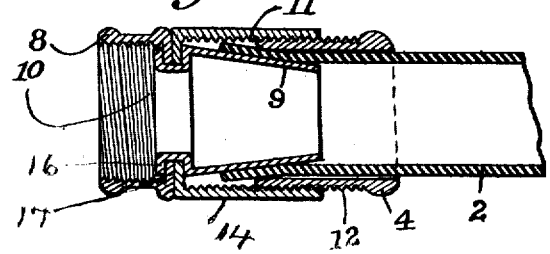
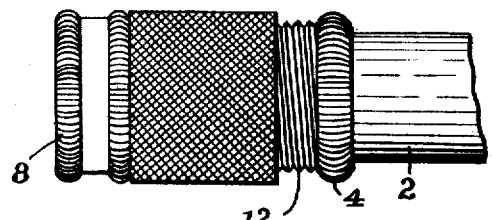

Patented Aug. 26, 1924.

1,506,048

UNITED STATES PATENT OFFICE.

GEORGE W. CHARETTE, OF FORT COLLINS, COLORADO, ASSIGNOR OF ONE-HALF TO HUGH DONNAN, OF FORT COLLINS, COLORADO.

HOSE COUPLING.

Application filed January 15, 1923. Serial No. 612,733.

*To all whom it may concern:*

Be it known that I, GEORGE W. CHARETTE, a citizen of the United States, residing at Fort Collins, in the county of Larimer and State of Colorado, have invented certain new and useful Improvements in Hose Couplings, of which the following is a specification.

My invention relates to hose-couplings, and more particularly to couplings for flexible hose, and the like; and is adapted also for connecting pipe to a faucet or nozzle. It consists of an internal bracing thimble, an external sleeve, and a plurality of sleeves to take into the external sleeve and bind and hold the pipe between said sleeve and the thimble. When the connection is applied to a nozzle, or the like, one end of the thimble is bent up to form an annular flange to engage the flange of the nozzle or faucet.

The object of the invention is to so construct the same that it will have but few parts, will be efficient, durable, may be easily and cheaply manufactured, and the parts comprising the same may be repaired or replaced with little expense.

In the drawings forming a part of this specification, and in which like symbols of reference represent corresponding parts in the several views:—

Figure 1 is a longitudinal, sectional view of the device, as it appears applied;

Figure 2 is a central section of the device, as it appears applied to a faucet; and, Figure 3 is a view of the form shown in Fig. 2.

In the drawings the numerals 1 and 2 represent sections of a pipe connected and held by the device. 3 and 4 are sleeves adapted to embrace the sections of pipe; and 5 an internal bracing thimble between which and the sleeves 3 and 4 the pipe sections are clamped and held. 6 is a shoulder forming a groove in the thimble, the object of the same being to receive an internal ridge 7 on the external sleeve 13, said ridge engaging the groove and holding the parts securely together.

11 represents the internal threads on the external sleeve; 12 external threads on sleeves 3 and 4; and 14 is the modified external sleeve used for faucets or nozzles, the same formed with a flange 15. The flange 15 engages a groove formed by an upturned flange 16 on the thimble. The groove in the thimble also receives flange 17 formed on a connecting sleeve 8. The sleeve 8 has internal threads 10 formed in the same to receive the nozzle or faucet.

The operation of the device will be apparent from the foregoing description. The bracing thimble and external sleeve are placed in position the ridge on the latter taking into the groove in the former, the pipe sections forced in between the same, and the sleeves 3 and 4 are then screwed in place, making a secure connection.

Having now fully described my invention, what I claim as new, and desire to secure by Letters Patent, is:—

1. A hose-coupling, comprising an internal bracing thimble having reduced ends and a circumferential groove in its center, an external sleeve having a ridge to engage the groove in the internal thimble, and means for holding pipe between the same.

2. A hose-coupling, comprising an internal thimble having its center enlarged and a circumferential groove in the same, an external sleeve having a ridge to engage the groove in the internal thimble, and means for connecting and holding the sleeves in proper relation to each other.

3. A hose-coupling, comprising an internal thimble formed with an enlarged center and a circumferential groove in the same, and an external sleeve formed with a rib to engage the groove of the thimble.

4. A hose-coupling, comprising an internal thimble formed with a flange on the inner end and being reduced on its other end, an external sleeve having a flange to engage the internal thimble flange, and means for connecting a collar to the thimble flange.

In testimony whereof I affix my signature.

GEORGE W. CHARETTE.